(12) United States Patent
Palmer et al.

(10) Patent No.: US 7,381,460 B2
(45) Date of Patent: Jun. 3, 2008

(54) ENERGY ABSORBING MATERIAL

(75) Inventors: Richard Martin Palmer, Boxmoor (GB); Philip Charles Green, Stevenage (GB)

(73) Assignee: Design Blue Ltd., London (GB)

( * ) Notice: Subject to any disclaimer, the term of this patent is extended or adjusted under 35 U.S.C. 154(b) by 63 days.

(21) Appl. No.: 10/499,778

(22) PCT Filed: Dec. 23, 2002

(86) PCT No.: PCT/GB02/05886

§ 371 (c)(1), (2), (4) Date: Oct. 8, 2004

(87) PCT Pub. No.: WO03/055339

PCT Pub. Date: Jul. 10, 2003

(65) Prior Publication Data

US 2005/0037189 A1    Feb. 17, 2005

(30) Foreign Application Priority Data

Dec. 22, 2001 (GB) ................................ 0130834.5

(51) Int. Cl.
- *B32B 3/26* (2006.01)
- *B32B 3/06* (2006.01)
- *B32B 3/00* (2006.01)

(52) U.S. Cl. ............... 428/304.4; 428/306.6; 428/314.4

(58) Field of Classification Search ............ 428/304.4, 428/306.6, 314.4
See application file for complete search history.

(56) References Cited

U.S. PATENT DOCUMENTS 5,498,640 A    3/1996  Witt et al.
5,854,143 A    12/1998 Schuster et al.

FOREIGN PATENT DOCUMENTS

| | | |
|---|---|---|
| CH | 513224 | 11/1971 |
| EP | 1130053 | 5/2001 |
| GB | 1240390 | 7/1971 |
| GB | 1 381 571 | 1/1975 |
| GB | 1551483 | 8/1979 |
| JP | 6 220 242 | 8/1994 |
| JP | 6-220242 | 9/1994 |
| WO | WO 94/06851 | 3/1994 |
| WO | WO 03/022085 | 3/2003 |

OTHER PUBLICATIONS

Computer translation of JP 06-220242, see IDS filed Jun. 21, 2004 for the date and inventors.*
Derwent abstract of SU 211096A, Lebedev Synth Rubber R. 1968.*
International Search Report; PCT/GB02/05886; Aug. 13, 2003; R. Oudot.

* cited by examiner

*Primary Examiner*—Victor S Chang
(74) *Attorney, Agent, or Firm*—Marshall, Gerstein & Borun LLP

(57) ABSTRACT

A self-supporting energy absorbing composite includes: i) a solid foamed synthetic polymer matrix; ii) a polymer-based dilatant, different from i) distributed through the matrix and incorporated therein during manufacture of i); and iii) a fluid distributed through the matrix. In another embodiment, a self-supporting energy absorbing composite includes: iv) a solid, closed cell foam matrix; v) a polymer-based dilatant, different from i), distributed through the matrix; and vi) a fluid distributed through the matrix. In both embodiments, the combination of matrix, dilatant and fluid is such that the composite is resiliently compressible.

19 Claims, No Drawings

ENERGY ABSORBING MATERIAL

This invention relates to energy absorbing materials e.g. of the kind employed in systems designed for the protection of humans, animals or objects from damage by impact; referred to hereinafter as impact protection systems.

Conventionally, impact protection systems have employed, as the energy absorbing material, elastomer foams or similar relatively soft resiliently compressible materials. However only limited protection is achieved. In some systems, this energy absorbing material is employed in combination with a rigid member the purpose of which is to spread the impact force over a greater area and therefore reduce its effect. However, such systems tend to be inflexible and uncomfortable if in contact with a human body. Most vulnerable areas of the body which require protection, e.g. elbows and knees, undergo significant changes in geometry and thus any attempt to match a rigid load-spreading shape will usually fail. One solution is to introduce articulation into the rigid element but this can compromise performance and increases cost.

More recently, proposals have been made for the use of shear thickening silicone putty materials, known as silicone dilatants, in or as energy absorbing materials in impact absorption systems. By a shear thickening material or dilatant, we mean a material which viscously flows at low rates of deformation but, at an elevated rate of deformation, undergoes a substantial increase in viscosity with rate of change deformation. At significantly higher deformation rates, such as those induced by impact, the material becomes substantially stiff or rigid. For example, U.S. Pat. No. 5,599,290 describes a bone fracture prevention garment which employs, as the dilatant or shear-thickening material, a dispersion of solid particles in a viscous fluid. GB-A-2349798 describes an energy absorbing pad including a putty-like dilatant. However, in both cases, the dilatant has to be contained in an envelope because of its non self-supporting nature. The resulting products therefore tend to lack flexibility and will require relatively complex and expensive manufacturing processes.

JP 6-220242 discloses a shock absorbing material which consists of a flexible, three-dimensional mesh or foam body which has interconnected hollow spaces in its interior, and whose surface is coated with silicone bouncing putty.

The present invention provides an energy absorbing material suitable for use in or as an impact absorption system and which is self-supporting.

According to one aspect of the present invention, there is provided a self-supporting energy absorbing composite comprising:
  i) a solid foamed synthetic polymer, suitably an elastic, preferably an elastomeric matrix;
  ii) a polymer-based dilatant, different from i), distributed through the matrix and incorporated therein during manufacture of i); and
  iii) a fluid distributed through the matrix, the combination of matrix, dilatant and fluid being such that the composite is resiliently compressible, and preferably also flexible.

By resiliently compressible we mean a resistance to compressive set.

By a solid matrix, we mean a matrix material which retains its own boundaries without need of a container. Usually, the matrix will be elastic.

According to a second aspect of this invention, there is provided a self-supporting energy absorbing composite comprising:

i) a solid, closed cell foam matrix;
  ii) a polymer-based dilatant, different from i), distributed through the matrix; and
  iii) a fluid distributed through the matrix, the combination of matrix, dilatant and fluid being such that the composite is resiliently compressible.

In addition to being self-supporting, the composite of the invention offers a degree of impact protection which can potentially exceed that of current rigid systems and moreover, in the preferred embodiment wherein it is both flexible and resiliently compressible, it has the ability to conform to the geometry of what it is designed to protect by maintaining intimate contact through relatively large changes in geometry. This is a key feature for the design of protective components because induced damage is a function of the maximum force resulting from the impact divided by the area over which this force is distributed. The composite of the invention enables both a reduction in the force and an increase in the area on which the force acts or is reacted, thereby significantly reducing the resulting pressure or stress transmitted for a given impact energy. It also offers the ability to exhibit some conformity to the impactor and thus produce additional force absorption as well as favourable geometry in terms of abrasion resistance. By means of the invention, it is also possible to achieve improved performance compared to the use of an equivalent mass of dilatant when used on its own.

While it is to be understood that other solid materials may be suitable for use as the matrix, in one, preferred embodiment of the invention, the matrix is selected from elastomers. While natural elastomers, e.g. latex rubbers, may also be used, our preference is for synthetic elastomers, including synthetic thermoplastic elastomers. One preferred class of synthetic elastomers is elastomeric polyurethanes but it is expected that others such as silicone rubbers and EP rubbers, e.g. EPDM rubbers may also be suitable.

In general, the resilient compressibility of the composite will be provided by the fluid which is dispersed throughout the matrix. Usually, the fluid will be substantially uniformly dispersed throughout the matrix but non-uniform dispersion may be desirable in certain cases. The resilient compressibility may be due to redistribution of fluid within the matrix and/or (in the preferred case wherein the fluid comprises gas) compression of the fluid. Thus, for example, the combination of matrix and fluid may advantageously be a foamed elastomer, e.g., a foamed polyurethane elastomer, the foam may be open-cell, closed-cell or part open, part closed. An important property of the foam is the rate at which it recovers after being subjected to compression. Preferably, recovery is complete or substantially complete within a few seconds, e.g. 5 seconds or less, more preferably 2 seconds or less. However, a slower rate of return may actually be preferably for some applications.

Any polymer-based dilatant that can be incorporated into the chosen matrix may be used. By a "polymer-based dilatant" it is meant a material in which the dilatancy is provided by polymer alone or by a combination of polymer together with one or more other components, e.g. finely divided particulate material, viscous fluid, plasticiser, extender or mixtures thereof, and wherein the polymer is the principal component. In one preferred embodiment, the dilatant is selected from silicone polymer-based materials exhibiting dilatant characteristics. The silicone polymer is preferably selected from borated silicone polymers. The dilatant may be combined with other components in addition to the components providing the dilatancy, e.g. fillers, plasticisers, colorants, lubricants and thinners. The fillers may be particulate (including microspheres) or fibrous or a mixture of particulate and fibrous. One class of particularly preferred dilatants comprises the borated siloxane-based material marketed by Dow Corning under catalogue no. 3179 where polyborodimethylsiloxane (PBDMS) constitutes the base polymer.

Other polymer-based dilatant materials having similar dilatancy characteristics, e.g. a similar modulus at low rates of strain and a similar plot of modulus against strain rate are also included.

The composite of the invention may be formed by combining a solid matrix, a polymer-based dilatant and a fluid whereby the dilatant and fluid are distributed, generally substantially uniformly, throughout the matrix to produce a resiliently compressible material. Where the matrix is chosen from synthetic elastomers, one suitable method comprises incorporating a polymer-based dilatant into a foamed synthetic elastomer. The dilatant may be incorporated during the formation of the foam. For example, the foam-forming ingredients may be reacted to form the foam in the presence of a solution or dispersion of the dilatant. Whatever method is used, however, while the dilatant may be incorporated into the pores of the foam, it is important that it does not completely displace the fluid from the pores.

The composite of the invention may include components other than the dilatant and fluid, e.g., fibrous and/or particular fillers, plasticisers, lubricants, extenders, pigments, dyes, etc. If desired, the composite of the invention may be incorporated within an envelope which may be rigid or flexible, but this is not essential. Likewise, it may be associated with a rigid component but this is not essential for the use of the composite and may even compromise some of its properties.

A coating may be applied to the composite, if desired.

The actual constitution of the composite will be influenced by the intended application. Applications cover a wide range of uses and include impact protection for objects, animals and humans. Potential applications extend to any dynamic situation where the object may already be in contact with a surface and the combination of object and surface may undergo severe acceleration and/or deceleration, e.g. as in packaging for delicate equipment or a human body in a vehicle seat. Thus, the nature of resiliently compressible mass, the amount of fluid in the mass, e.g. as indicated by the density of the mass, and the choice and level of loading of the dilatant in the mass, will be determined by the requirements of the protective system in which the composite is to be employed. In general, the dilatant will form from 5 to 80%, preferably 10 to 50%, more preferably 20 to 40% (such as 15 to 35%) by volume of the composite, and the amount of fluid (in the preferred case where it is gas) will be such that the fluid content of the composite is preferably about 30 to 90% (such as 20 to 90%) more preferably about 45 to 90% (such as 30 to 80%) still more preferably about 55 to 85% (such as 40 to 70%) by volume. It should be noted that these proportions are excluding the use of any fillers or additional components.

The energy absorbing composite of the invention may be employed in a wide variety of applications; for example in protective pads or clothing for humans and animals, in or as energy absorbing zones in vehicles and other objects with which humans or animals may come into violent contact, and in or as packaging for delicate objects or machinery. Specific examples of applications are in headwear and helmets; protective clothing or padding for elbows, knees, hips and shins; general body protection, for example for use in environments where flying or falling objects are a hazard, vehicle dashboards, suspension bushes, upholstery and seating. Other potential uses are in garments or padding to protect parts of the body used to strike an object e.g. in a sport or pastime; for example in running shoe soles, football boots, boxing gloves and gloves used in the playing of fives. This list is not intended to be exclusive and other potential uses will occur to the reader.

The following Examples illustrate the invention in which dilatant materials were incorporated into a solid foamed synthetic polymer matrix during its manufacture.

EXAMPLE 1

This example details the inclusion of the pure polyborodimethylsiloxane (PBDMS) dilatant during the manufacture of polyurethane (PU) foam.

The base PU system is marketed by Jacobson Chemicals Ltd., Farnham, Surrey. The product is a modelling foam reference J-Foam 7087. This is a two part system which requires the mixing of two components, part A and part B in the ratio of 3 to 1 respectively. This mix can then be cast into open or closed moulds to produce a shaped foam component. During the reaction of parts A and B a gas (believed to include carbon dioxide) is evolved to produce a closed cell structure in a PU soft foam.

The PBDMS supplied by the Chemical Institute, Warsaw, Poland was pre-mixed with the J-Foam part A at room temperature in a polyethylene beaker by hand with the aid of a wooded spatula for approximately 15 minutes until the mix appear homogenous. Various ratios of PBDMS to part A were trialed and are detailed as follows:

Trial 1-15 g PBDMS+40 g part A

Trial 2-15 g PBDMS+30 g part A

Trial 3-39 g PBDMS+50 g part A

Each of the above pre-mixes was then mixed with part B using the same mixing method and maintaining the 3 to 1 ratio of part A to part B irrespective of the amount of PBDMS. This mixing time was typically around 10 seconds. These 3 component mixtures were next cast into a flat bottomed open polyethylene container and allowed to expand freely to produce the foams.

As the PBDMS has a very much higher viscosity than either part A or part B, increasing the proportion of PBDMS produced a reduction in density of the resulting foam. The increased viscosity (melt strength) of the 3 component mix restricted the expansion of the mix during reaction and cure stage. To establish the effect of reducing the viscosity of the PBDMS/part A pre-mix by heating this pre-mix an additional batch of trial 3 was made with the pre-mix being heated to 65 degrees Celsius before mixing with part B. This sample was then cast immediately after mixing in the same way as previous specimens, but with the mould pre-heated to 65 degrees Celsius also. The resulting densities of foam were produced:

Trial 1-400 kg/m$^3$

Trial 2-500 kg/m$^3$

Trial 3 (65° C. pre-heated)-380 kg/m$^3$

The densities were measured simply by weighing the samples and measuring the linear dimensions to establish the total volume and dividing this by the weight of the samples.

EXAMPLE 2

The same technique as shown in Example 1 was applied to the manufacture of PU foam containing Dow Corning 3179 silicone dilatant. This dilatant is a filled PBDMS where the percentage of PBDMS is 65% by weight. This renders 3179 stiffer and stronger than the pure PBDMS. As a result of the presence of these fillers 3179 would not mix with J-Foam part A even with the assistance of an electric food blender. Using the electric blender 50 g of 3179 was dissolved in 40 g isopropyl alcohol (IPA), as solvent, then mixed with approximately 100 g of J-Foam part A. This produced a creamy emulsion. In order to minimize the amount of IPA present during the subsequent reaction with J-Foam part B the blender was left switched on with the 3179 and IPA and J-Foam part A mixture in a fume cupboard to encourage evaporation of the IPA. This was left for 1 hour. The evaporation of the IPA over this period of time caused the 3179 dilatant to come out of the solution and to form solid globules of dilatant in the mix. The procedure was therefore repeated but during the evaporation stage the blender was stopped at 10 minute intervals to observe visually the nature of the mixture. After 40 minutes tiny particles of 3179 dilatant in suspension were just detectable with the naked eye and at this stage part B was introduced into the mixture by hand and cast into an open container as before and again maintaining the 3 to 1 ratio of part A to part B. The resulting foam had a measured density of 290 kg/m$^3$ with a large closed cell structure (cell diameters approximately 0.7 to 1.2 mm).

In order to increase the density of this foam the procedure was repeated with the addition of 35 g of PBDMS during the blending of the 3179 dilatant, IPA and J-Foam part A to increase the viscosity of the mix. The resulting foam was of much smaller cell size (cell diameters approximately 0.1 to 0.4 mm) and of higher density—640 kg/m$^3$.

The invention claimed is:

1. A self-supporting energy absorbing composite comprising:
   i) a solid foamed synthetic polymer matrix;
   ii) a polymer-based dilatant, different from i) distributed through the polymer of the matrix and incorporated into the polymer of the matrix during formation of i); and
   iii) a fluid distributed through the matrix,
the combination of matrix, dilatant and fluid being such that the composite is flexible and resiliently compressible.

2. An energy absorbing composite as claimed in claim 1 in which the matrix is elastic.

3. An energy absorbing composite as claimed in claim 1 wherein the matrix is selected from synthetic elastomers.

4. An energy absorbing composite as claimed in claim 3 wherein the synthetic elastomer is selected from elastomeric polyurethanes.

5. An energy absorbing composite as claimed in claim 1, wherein the polymeric dilatant is selected from silicone polymers exhibiting dilatant properties.

6. An energy absorbing composite as claimed in claim 5 wherein the silicone polymer is selected from borated silicone polymers.

7. An impact protection system including an energy absorbing composite as claimed in claim 1.

8. An energy absorbing composite as claimed in any one of the preceding claims or claim 7, wherein the fluid is a gas.

9. The energy absorbing composite of claim 6, wherein the borated silicone polymer is polyborodimethylsiloxane (PBDMS).

10. The energy absorbing composite of claim 1, wherein the dilatant comprises about 65% to 100% polyborodimethylsiloxane (PBDMS) by weight.

11. The energy absorbing composite of claim 1, wherein the dilatant is about 100% polyborodimethylsiloxane (PBDMS) by weight.

12. The energy absorbing composite of claim 1, wherein the composite comprises about 20-40% polyborodimethylsiloxane (PBDMS) by weight.

13. The self-supporting energy absorbing composite of claim 1, wherein the PBDMS is incorporated before formation of the foam.

14. The self-supporting energy absorbing composite of claim 1, wherein the PBDMS is incorporated during formation of the foam.

15. An energy absorbing composite obtained by a method comprising combining:
   i) a solid foamed synthetic polymer matrix;
   ii) a polymeric dilatant, different from i), and
   iii) a fluid
whereby the dilatant is distributed throughout the polymer of the matrix by incorporating the dilatant into the foamed synthetic polymer of the matrix during manufacture of the matrix and the fluid is distributed substantially uniformly throughout the matrix to produce a resiliently compressible-material.

16. An energy absorbing composite comprising:
   i) a solid foamed synthetic elastomeric polyurethane matrix;
   ii) a dilatant comprising polyborodimethylsiloxane (PBDMS) distributed through the polymer of the matrix and incorporated into the polymer of the matrix during formation of i); and
   iii) a gas distributed through the matrix,
the combination of polyurethane matrix, PBDMS and gas being such that the composite is flexible and resiliently compressible.

17. A self-supporting energy absorbing composite comprising:
   i) a solid foamed synthetic polymer matrix formed by reacting foam forming ingredients in the presence of a polymer-based dilatant;
   ii) a polymer-based dilatant, different from i) distributed through the polymer of the matrix and incorporated into the polymer of the matrix during formation of the foamed synthetic polymer matrix; and
   iii) a fluid distributed through the matrix,
wherein the foamed synthetic polymer matrix is formed by reacting the foam forming ingredients in the presence of the dilatant, such that the dilatant is distributed through the foamed synthetic polymer matrix;
the combination of matrix, dilatant and fluid being such that the composite is flexible and resiliently compressible.

18. The self-supporting absorbing composite of claim 17, wherein the synthetic polymer matrix comprises synthetic elastomers.

19. The self-supporting absorbing composite of claim 18, wherein the elastomers comprise polyurethane.

* * * * *